United States Patent
Einecke et al.

(10) Patent No.: US 9,557,739 B2
(45) Date of Patent: Jan. 31, 2017

(54) SENSOR CLEANING SYSTEM FOR AN AUTONOMOUS ROBOT DEVICE, BASE STATION AND CORRESPONDING METHOD

(71) Applicant: HONDA RESEARCH INSTITUTE EUROPE GMBH, Offenbach/Main (DE)

(72) Inventors: Nils Einecke, Offenbach (DE); Mathias Franzius, Offenbach (DE); Bernhard Sendhoff, Offenbach (DE)

(73) Assignee: HONDA RESEARCH INSTITUTE EUROPE GMBH, Offenbach Main (DE)

( * ) Notice: Subject to any disclaimer, the term of this patent is extended or adjusted under 35 U.S.C. 154(b) by 121 days.

(21) Appl. No.: 14/564,549

(22) Filed: Dec. 9, 2014

(65) Prior Publication Data

US 2015/0198952 A1  Jul. 16, 2015

(30) Foreign Application Priority Data

Jan. 10, 2014 (EP) .................... 14150735

(51) Int. Cl.
 *G05D 1/02* (2006.01)
 *B08B 3/02* (2006.01)
 (Continued)

(52) U.S. Cl.
 CPC ........... *G05D 1/0225* (2013.01); *A01D 34/008* (2013.01); *B08B 1/002* (2013.01);
 (Continued)

(58) Field of Classification Search
 CPC .................................................. G05D 1/0225
 (Continued)

(56) References Cited

U.S. PATENT DOCUMENTS 6,527,000 B1   3/2003  Randmae et al.
6,611,120 B2 *  8/2003  Song .................... G05D 1/0038
                                                318/568.12
(Continued)

FOREIGN PATENT DOCUMENTS

WO   WO 2005/074362 A2   8/2005

OTHER PUBLICATIONS

European Search Report dated Sep. 12, 2014 corresponding to European Patent Application No. 14150735.0.
Atema J. et al., "Facility provided with mobile robotic device," Research Disclosure, Mason Publications, Hampshire, GB, vol. 539, No. 84, Mar. 1, 2009, p. 320, XP007138882.
(Continued)

*Primary Examiner* — David S Luo
(74) *Attorney, Agent, or Firm* — Squire Patton Boggs (US) LLP (57) ABSTRACT

The inventive system comprises an autonomous robot device, a base station and a method operating the same. The autonomous robot device includes a sensor means, e.g. an optical sensor, and a propulsion means. The base station includes a cleaning means specifically adapted for cleaning the sensor means of the autonomous robot device. In a preferred embodiment the propulsion means of the autonomous robot device is configured to move the autonomous robot device in a manner suitable to generate a relative movement of the autonomous robot device with respect to the passive cleaning means arranged at the stationary base station to effect the cleaning of the sensor means of the autonomous robot device.

18 Claims, 4 Drawing Sheets

(51) Int. Cl.
  *B08B 1/00* (2006.01)
  *A01D 34/00* (2006.01)
(52) U.S. Cl.
  CPC ............... *B08B 1/006* (2013.01); *B08B 3/02* (2013.01); *G05D 2201/0215* (2013.01); *Y10S 901/01* (2013.01); *Y10S 901/30* (2013.01); *Y10S 901/46* (2013.01)
(58) Field of Classification Search
  USPC ........................... 318/568.12, 568.11, 568.1
  See application file for complete search history.

(56) References Cited

U.S. PATENT DOCUMENTS

| | | | | |
|---|---|---|---|---|
| 6,956,348 B2* | 10/2005 | Landry | ................. | A47L 9/2805 15/319 |
| 7,993,469 B1* | 8/2011 | Vallapuzha | ............... | B08B 9/04 134/18 |
| 8,364,312 B2* | 1/2013 | Tobey | ...................... | B25J 5/007 318/400.37 |
| 2012/0169497 A1 | 7/2012 | Schnittman et al. | | |

OTHER PUBLICATIONS

Vorwerk: "Gebrauchsanleitung Saugroboter Kobold VR100 and Zubehor," Internet, Nov. 8, 2011, XP002729101, Retrieved from the Internet: http://kobold.vorwerk.de//fileadmin/data/de/pdf/gebrauchsanleitungen/relaunch/Kobold_VR100_Saugroboter_Betriebssystem2011_GA_111114.pdf, retrieved on Aug. 28, 2014, p. 32.

\* cited by examiner

SENSOR CLEANING SYSTEM FOR AN AUTONOMOUS ROBOT DEVICE, BASE STATION AND CORRESPONDING METHOD

BACKGROUND

Field

The present invention relates to a system, a base station and a method for cleaning a sensor of an autonomous robot device like an autonomous garden device. In particular the present invention relates to a base station for an autonomous lawn mower and a system for cleaning an optical sensor mounted on the autonomous lawn mower. The present invention further relates to a base station for an autonomous robot device and a method for cleaning the sensor of the autonomous robot device.

Autonomous or robotic devices, e.g. autonomous lawn mowers, are an increasing market. In many approaches of autonomous lawn mowers the working area is delimited by an electric border wire generating an electromagnetic field. This electromagnetic field is used by the autonomous device to identify the assigned working area, and to find a docking station or base station for recharging its energy storage. For avoiding static or dynamic obstacles that are not indicated by the border wire some commercially available autonomous mowers use bump sensors and/or sonar sensors.

Description of the Related Art

The term "autonomous device" is well known to the man skilled in the art as referring to an unmanned device which has a drive means or propulsion means in order to move the autonomous device ("self-propelled device"), an onboard energy reservoir to power the propulsion means, one or more sensors and a control means functionally connected to the sensor(s) and the drive means. The autonomous device navigates in a free manner without human support based on sensor data acquired by the sensor(s) and processed in the control means in order to generate control signals for the propulsion means.

WO 2005/074362 A2 discloses a docking station and an autonomous robot for docking therein, the docking station providing capabilities of recharging the autonomous robot's battery and exchanging signals with the autonomously operating robot.

A future path for improving the functionality of autonomously operating robot devices particularly in the outdoor environment includes furnishing more sensors and/or sensors with improved characteristics or altogether new capabilities such as optical sensors to the autonomous device. However the quality of signals generated by these new sensors and in particular by optical sensors, e.g. cameras, depend on clean optics and lenses for acquiring the visual information in the demanding outdoor environment. An outdoor environment such as a garden under varying weather conditions and performing tasks such as cutting grass in case of a autonomous lawn mower further increases the exposure of the sensor to dirt, sand, parts of plants, water, etc. Hence regular maintenance of the sensors is of high importance to achieve a high mean time between failure of the autonomous device due to sensor failure.

In outdoor environment exists a long standing need for providing surveillance cameras with a minimum at regular maintenance to be necessary for a guarantying a high level of availability for the surveillance camera sensor even when mounting the surveillance camera under a protective camera dome. Patent document U.S. Pat. No. 6,527,000 B1 provides a surveillance camera dome with a device mounted wiper and washer assembly and for cleaning the surveillance dome surface in order to provide the camera with an unobstructed view over the full viewing area without requiring a regular operator maintenance. The features disclosed in the document U.S. Pat. No. 6,527,000 B1 for cleaning the sensor equipment at short intervals would seem advantageous to the man skilled in the art.

However the aim of providing the sensor of an autonomous robot with a washer and wiper assembly introduces an additional motor or actuator and also a tank for cleaning agents to be refilled at regular intervals. Therefore the complexity of the autonomous robot device and the complexity of its operation is further increased.

Hence the technical problem of providing an autonomous robot device with a robust, capable and cost effective sensor cleaning mechanism arises.

SUMMARY

The technical problem is solved by a system according to the invention comprising an autonomous robot device comprising a sensor means and a propulsion means. The system further includes a base station for supporting the autonomous robot device, and the system is characterised in the base station including a cleaning means, wherein the cleaning means is adapted to clean the sensor means of the autonomous robot device.

The claimed combination of features provides the autonomous robot device with an advantageous cleaning system that is robust and dispenses with additional actuators for the cleaning system at the autonomous robot device, which would reduce the availability of the autonomous robot device adversely. The cleaning means of the cleaning system further dispenses with the need for providing the single dynamic portion of the system represented by the autonomous robot device with any further mechanical cleaning assembly prone to malfunction due to dirt and further increasing the complexity of the autonomous robot device. The additional cleaning system according to the invention is arranged in its mechanical and structural portions at the static base station and not at the moving portion of the system consisting of the autonomous robot device. Thus unintentional damage of a device mounted cleaning means can also be avoided.

The cleaning system according to the invention further dispenses with the need for maintaining storage for cleaning agents at the autonomous robot device and in an embodiment of the invention even at the base station. In any case the device itself is lighter so that the overall energy consumption of the device can be further reduced. Not every cleaning agent is suitable to be used in every environment and should in particular not be spilled onto soil in an uncontrolled manner for ecological reasons. Hence providing the cleaning means at the base station provides the advantage of working with cleaning agents only at a predefined place and therefore additional means for collecting any spilled fluid comprising cleaning means with some sort of tray arranged at the base station becomes possible. A further advantage of arranging a cleaning fluid tank at the base station is to be found in the less restrictive space to found at the static base station, the more easy access of a maintenance operator at the base station the base station for the purpose of refilling the cleaning agent and supervising a fill level of the cleaning agent tank.

In a preferred embodiment of the invention the propulsion means of the autonomous robot device is configured to propel the autonomous robot device in such a manner that a relative movement of the robot device including the sensor means mounted on the autonomous robot device with respect to the cleaning means arranged at the base station to effect the cleaning of the sensor means is generated.

Hence an additional actuator such as an electric wiper motor is not required in order to clean the sensor means and the system is kept simple. The lack of a dedicated actuator for the cleaning means results in advantageously reduced complexity of the overall system comprising the autonomous robot device and the base station, thereby increasing availability of the autonomous robot device and at the same time reducing manufacturing costs.

In a further embodiment of the claimed invention the propulsion means of the autonomous robot device is configured to move the autonomous robot device towards a first position for performing cleaning relative to the base station, wherein the first position as a cleaning position is different from a second position in which charging of a energy storage means of the autonomous robot device at the base station is performed.

Providing a first position for cleaning at the base station which is spatially different from a second position at the base station for charging the autonomous robot device is advantageous, as the sensor of the autonomous robot device then may not necessarily be cleaned each time the autonomous robot device arrives at the base station for charging its energy storage. Further the operation of multiple autonomous robot devices with only one base station may be more easily organized when providing different sensor cleaning positions and recharging positions at a base station. Providing different positions for charging also enables to separate technical requirements for charging the energy storage (rechargeable battery or accumulator) of the autonomous robot device which is advantageously executed with the autonomous robot device remaining in an entirely static position with respect to the base station on one hand. On the other hand cleaning the sensor means of the autonomous robot device by moving the autonomous robot device to generate a relative movement of the sensor means with respect to the cleaning means to effect the cleaning of the sensor means is advantageously executed when moving the autonomous robot device in a suitable manner towards or from the first position at the base station.

In an advantageous embodiment of the invention the cleaning means is configured to effect a brushing or wiping movement across the sensor means when the autonomous robot device is entering or leaving the first position for cleaning the sensor means at the base station. The system does therefore entirely dispense with an additional actuator for the cleaning of the sensor means and rely solely on the propulsion means of the autonomous robot device as an actuator or active element for performing the sensor cleaning.

The invention is particularly advantageous, when the sensor means comprises one or more optical sensors such as cameras. The use of cameras in the outdoor environment provides the autonomous robot device with an enhanced control capability, but the vision of cameras on the other hand significantly decreases with the dust on a lens of a camera. Hence navigation and other operational characteristics of the autonomous robot device exposed to dust profits from the provision of a sensor cleaning means according to the invention.

The autonomous robot device of a preferred embodiment of the present invention is an autonomous lawn mower. The autonomous lawn mower also comprises working means including one or more blades for cutting grass and tends to soil rapidly with the cut grass adhering to any surface of the autonomous lawn mower when operating. Hence the sensor cleaning means according to the invention is most advantageously used together with an autonomous lawn mower and enables secure and simultaneously cost effective operation of the autonomous lawn mower equipped with optical sensor means.

The cleaning means according to an embodiment of the invention comprises at least one of a brush, a cleaning cloth, water, cleaning agents and pressurized gas.

An advantageous embodiment of the invention includes an autonomous robot device further comprising a control means wherein the control means is configured to initiate cleaning of the sensor means each time the autonomous robot device arrives at or departs from the base station. As the autonomous robot device can only carry a limited energy capacity, recharging of the autonomous robot device at the base station at regular intervals is necessary. If the cleaning process is initiated each time the autonomous robot device arrives at or departs from the base station, a continuous clean state of the sensor means is maintained.

In another embodiment of the claimed invention the control means of the autonomous robot device is configured to initiate cleaning of the sensor means based on to at least one of a time schedule, a user request, a sensor state, a sensed weather and a weather report. When not initiating the sensor cleaning process each time the autonomous robot device arrives or departs from the base station provides the advantageous effect of decreasing sensor wear due to frequently cleaning the sensor means. Therefore sensor life or at least the time interval between replacement of a transparent sensor cover shielding the sensor means is advantageously increased.

A further advantageous embodiment of the invention provides the control means being configured to use data acquired from the sensor means in order to control the relative movement of the autonomous robot device for the cleaning of the sensor means. Hence, the sensor means may be cleaned in a more targeted manner by providing information where dirt affects the vision in the aperture of the sensor means or the cleaning process may be performed until a predefined vision quality is achieved.

A further aspect of the claimed invention refers to a base station that includes a cleaning means wherein the cleaning means is specifically adapted to clean a sensor means of the autonomous robot device.

It is particularly preferred when the base station includes the cleaning means at such a position that the robot device approaching a first position at the base station effects cleaning, and that the first position at the base station is different from a second position of the robot device at the base station suitable for charging an energy storage of the autonomous robot device at the base station.

In a further advantageous embodiment the base station includes the cleaning means supports a cleaning unit elastically. The elastically supported cleaning member may use a spring arrangement for wiping or brushing with a cleaning tool such as brush, cloth, sponge etc. with predetermined pressure over the sensor means and thereby remove any dirt from the sensor surface. The elastically supporting of the cleaning unit therefore advantageously renders an additional active actuator for the cleaning means to be unnecessary and enables to effect cleaning with an entirely passive cleaning means.

A further aspect of the claimed invention refers to a method for a system comprising an autonomous robot device wherein the autonomous robot device includes a sensor means and a propulsion means, wherein the system further comprises a base station including a cleaning means and the method is further characterized in comprising a step of moving the autonomous robot device to the base station for cleaning the sensor means, and a step of cleaning the sensor means by the cleaning means of the base station.

A particularly preferred embodiment of the invention includes the sensor means in the step of cleaning by moving the autonomous robot device relatively to the base station and thus the cleaning means to effect the cleaning of the sensor means, thereby rendering a specific active actuator for the cleaning means to be dispensable and entirely relying on the propulsion means of the autonomous robot device for the cleaning of the sensor means in passive manner.

A further advantageous embodiment of the invention includes in the step of cleaning moving the autonomous robot device relative to the base station towards a first position at the base station for cleaning the sensor means, wherein the first position at the base station is different from a second position at the base station destined for charging the autonomous robot device at the base station.

Another advantageous embodiment of the inventive method further comprises a step of determining whether the sensor means requires to be cleaned and the step of determining determines either that the sensor means is to be cleaned each time the autonomous robot device arrives at or departs from the base station, or alternatively determines that the cleaning of the sensor means is to be performed according to a time schedule and/or in response to a user request and/or in response to a determined sensor state and/or in response to a sensed weather and/or in response to a received and analyzed weather report.

It is further advantageous to include in the step of cleaning performing cleaning of the sensor means using and based on evaluation of data acquired from the sensor means in order to control the relative movement of the autonomous robot device for the cleaning of the sensor means.

BRIEF DESCRIPTION OF THE DRAWINGS

The control system and the respective method are preferably used in an autonomous lawn mower but may be used in any other autonomous garden tool comprising sensors also. The invention in general and specific details of the invention will be explained now with reference to the appended figures in which.

DETAILED DESCRIPTION

The following description and explanation refers to an autonomous lawn mower as a typical example of an autonomous robot device according to the invention. Of course it is evident that any details which are discussed in the following may also be used in conjunction with other autonomous garden tools or any autonomous robot device employing sensors. Such robot device forms a system with a base station.

In particular the autonomous robot device may be one of a cleaning robot, vacuum cleaner or window cleaner or even any propelled (e.g. electrically propelled) vehicle operating from a base station.

Figure 1:
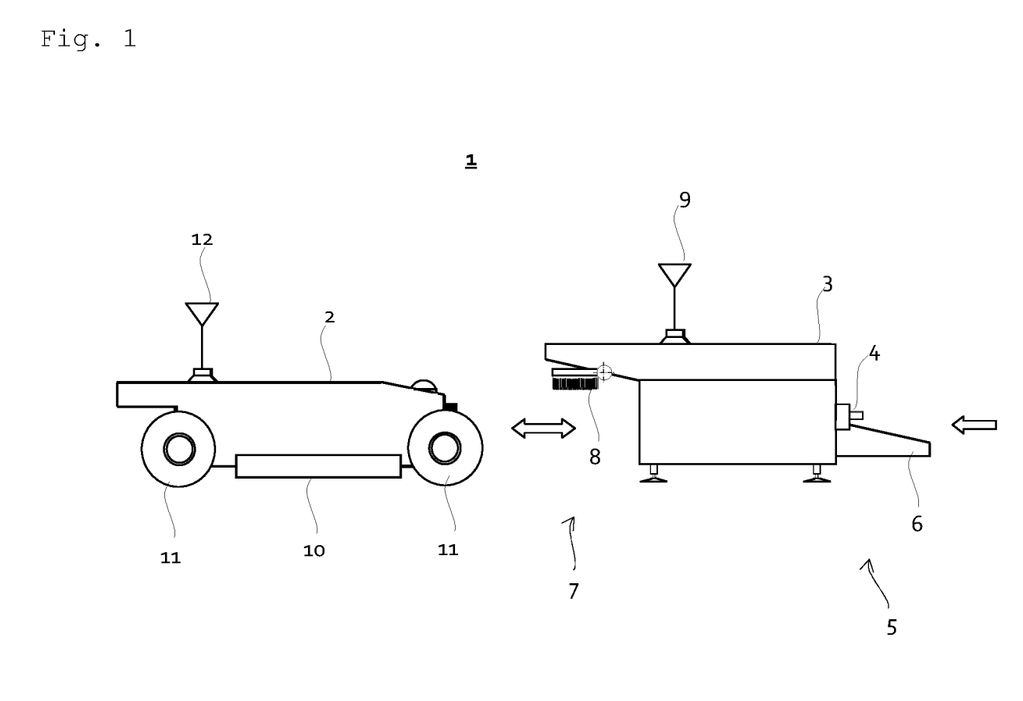
FIG. 1 shows a system including an autonomous robot device and its base station according to an embodiment of the invention.

FIG. 1 shows a system 1 including an autonomous robot device and its base station 3 according to an embodiment of the invention. The autonomous robot device 2 in the FIG. 1 and the base station 3 both form part of the system 1. The base station 3 is specifically adapted to recharge the energy storage means or battery of the autonomous robot device and includes for this purpose an electrical connector 4 operative to connect to a charging interface of the robot device when the autonomous robot device 2 is in a charging position 5 for charging the autonomous robot device 2. The base station 3 as depicted in FIG. 1 may also include mechanical means 6 for guiding the autonomous robot device 2 to the charging position 5 for charging the autonomous robot device 2. In the base station 3 a first position 7 for cleaning a sensor means of the autonomous robot device 2 is defined. The first position for cleaning a sensor means of the autonomous robot device 2 is situated at another spatial position of the base station 3 than a second position 5 which is the charging position for charging the autonomous robot device 2.

Relative to the first position for cleaning the autonomous robot device a cleaning means 8 comprising a brush is arranged in a suitable position to clean the sensor means 14 of the autonomous robot device 2 due to a movement of the robot device 2. In the example shown in FIG. 1 a housing of the base station 3 has an extended portion arranged at a defined height above the ground. The cleaning means 8 includes a brush or wiper cloth situated at the free first end of a rotatable member while the other end of the rotatable member is rotatably linked at an extended portion of the housing of the base station 3. A spring or similar means which is not explicitly shown in FIG. 1 can support the rotatable cleaning member elastically based at the housing, so that the rotatable member can be moved by a predetermined angle from its central rest position in both directions and always retunes to its central rest position.

Other configurations of the base station 3 are possible without departing from the claimed invention.

The base station 3 can for example define the second position for charging the autonomous robot device 2 inside the housing and thereby provide a protective shelter (garage) for the autonomous robot device 2.

In another embodiment the second position 5 for charging the autonomous robot device 2 and the first position 7 for cleaning the sensor means 14 of the autonomous robot device 2 may be the same. In this case the autonomous robot device 2 may move along the passive cleaning means 8 each time it approaches the base station 3 and moves towards the second position 5 for charging an energy storage means of the autonomous robot device 2. The second position 5 for charging the autonomous robot device 2 is then defined inside the housing of the base station 3 and access to the interior of the housing of the base station 3 will be possible through an opening of the housing of the base station 3. Driving the autonomous robot device 2 along a ramp into the housing of the base station 3 enables access to at least the second position 5. This configuration of the base station 3 including a shelter for the autonomous robot device 2 may be combined with the mechanical means 6 for guiding the autonomous robot device 2 to the second position 5 for charging the autonomous robot device 2 by lateral rails extending from the housing and converging at the opening in the housing enabling access to the shelter for the autonomous robot device 2.

The description up to now has been made with reference to an autonomous robot device 2 driven by a propulsion means in the form of an electric motor or a plurality thereof and therefore requiring a storing means for storing electric energy. Recharging of the electric energy storage means (battery) at regular intervals at the base station 3 is therefore required and electric connection with a connector 4 of the base station has to be made for this purpose. Of course other types of driving motors for the autonomous robot device are also possible, e.g. a combustion engine. Given this case fuel has to be refilled at regular intervals and instead of recharging the battery of the autonomous robot device 2, the base station is equipped to refill a fuel tank of the autonomous robot device 2 automatically.

The base station 3 may in addition to recharging a battery of the autonomous robot device 2 also be equipped to replenish any other stocks of working means of the autonomous robot device 2, e.g. with fertilizer for fertilizing a lawn in case of an autonomous lawn mower or with a cleaning agent in case of a autonomous cleaning robot.

The base station 3 as depicted in FIG. 1 further includes communication means 9 including an antenna for wireless communication between the autonomous robot device 2 and the base station 3 as well as communication between the components of the system 1 and a user and other infrastructure via a wireless local area network or a cellular wireless network, for example.

The autonomous robot device 2 as depicted in FIG. 1 may be an autonomous lawn mower. The autonomous lawn mower comprises working means 10 adapted to cut grass by means of including one or more blades for cutting grass. Cutting grass involves depositing the cut grass on the lawn in order to effect fertilizing and/or mulching. This also implies exposing the autonomous lawn mower to dirt, cut plant material, insects and thereby operating in an environment heavily characterized by dirt. This exposure to dirt is significant in particular to a sensor means 14 typically located at or near the front of the autonomous lawn mower 2 front body.

The sensor means 14 of the autonomous lawn mower 2 includes at least one optical sensor such as a camera or an array of optical sensors arranged in suitable positions of the autonomous lawn mower 2. Conventional autonomous lawn mowers 2 rely on acoustic (SONAR) and bump sensors for navigating through their assigned working area. The sensor means 14 of an embodiment may in addition or alternatively also include one or more of radar sensors, antennas for the reception of global positioning system (GPS) data and optical sensors. The preferred low layout of the autonomous lawn mower 2 and small dimensions of the autonomous lawn mower 2 in order to achieve high manoeuvrability and good access to regions of the working area with small dimensions lead to a close arrangement of the sensor means 14 to other components such as wheels 12 and the working means 10 of the autonomous lawn mower 2, which all add to the exposure of the sensor means 14 to dirt. However the functionality of the autonomous lawn mower 2 of an embodiment of the autonomous robot device 2 depends on the signal quality of the signals provided by the sensor means 14. In case of optical sensors 14, e.g. cameras, this necessary signal quality heavily depends on clean lenses or a clean sensor surface in general in order to achieve good signal quality and therefore sensor data of high quality and reliability in order to navigate with high reliability in an assigned working area and around any obstacles within the assigned working area.

The autonomous robot device 2 further includes a communication means represented by an antenna 12 for communicating with base station 3 of the system 1 and/or other communication partners such as a separate user interface equipment.

The autonomous lawn mower 2 is further provided with connecting means 13 for electrical and mechanical connection to a base station 3 in order charge a battery 18 of the autonomous lawn mower 2 at regular intervals, according to a time schedule, a sensed battery state or a request issued the base station 3 or a request issued by the user (operator).

Figure 2:
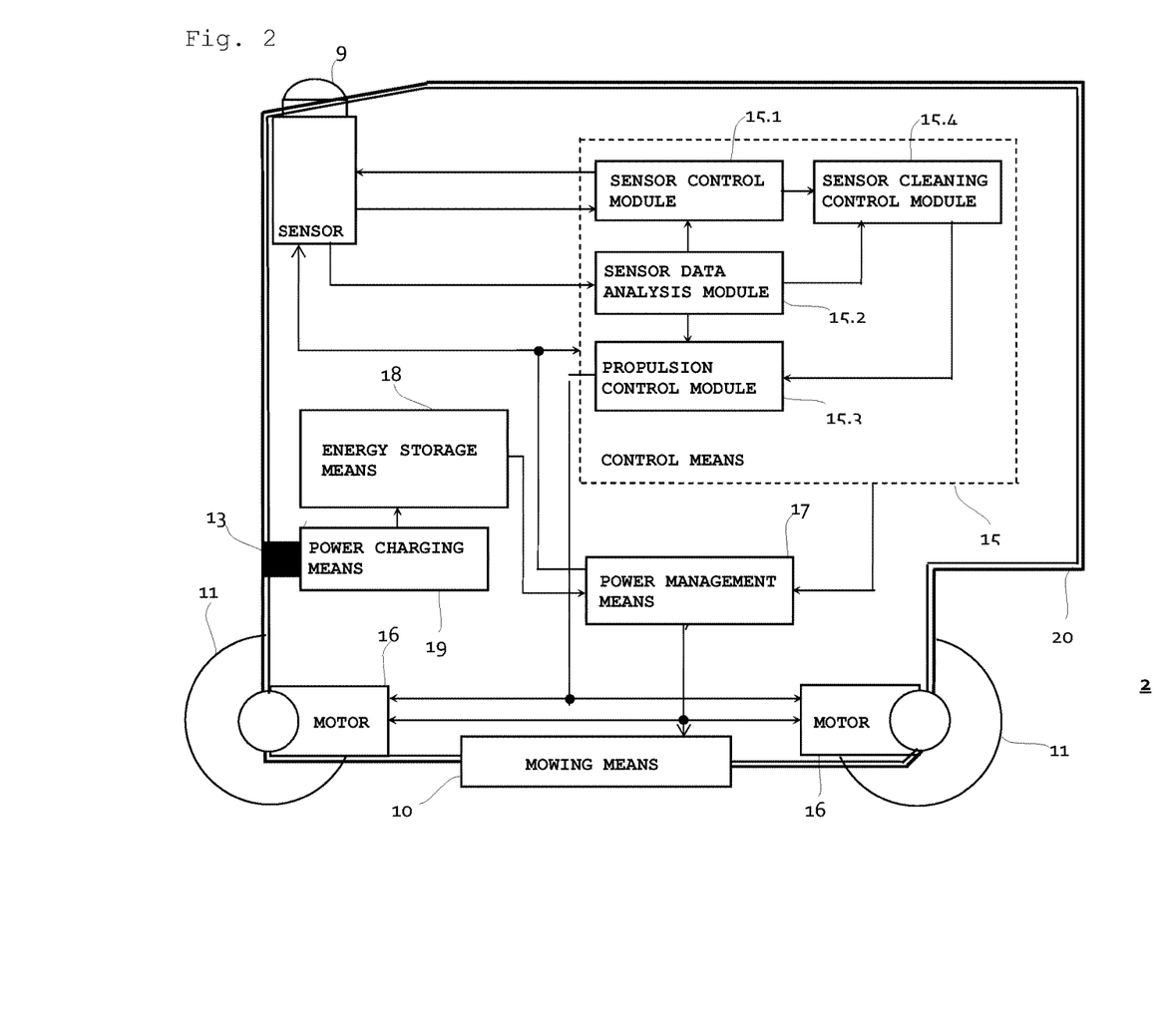
FIG. 2 depicts an autonomous robot device according to an embodiment with its functional units.

FIG. 2 depicts an autonomous robot device 2 according to an embodiment with its functional units. A sensor means 14 is arranged near the front end of the body in the main movement direction of the autonomous lawn mower 2 and extends with its lens beyond the housing 16 (main body) of the autonomous lawn mower 2 for an advantageous field of vision. The sensor means 14 may be protected by a transparent sensor cover not shown in FIG. 2 in order to protect the lens from mechanical damage by plants, thorns, other obstacles, weather phenomena like rain, etc. The sensor means 14 of an embodiment of the invention is an optical sensor and acquires visual data of the environment of the autonomous lawn mower 2 and provides the acquired sensor data in an image signal to a control means 15 of the autonomous lawn mower 2.

The autonomous lawn mower 2 is propelled by a propulsion means comprising at least one motor 16 driving one or more wheels 11 of the autonomous lawn mower 2. The autonomous lawn mower 2 may alternatively include tracks instead of the wheels 11. Each propelled wheel 11 may be driven by a electric motor 16 arranged at the wheel 11 or a single motor 16 may propel the propelled wheel 11 via a power distribution and gear assembly. In FIG. 2 the autonomous lawn mower 2 comprises a power management means 17 configured to distribute the electric power between the motor 16 and the other subassemblies of the autonomous lawn mower 2 requiring power, such as the control means 15, the sensor means 14 and the mowing means 10 as an specific example of the working means 10. The required power is stored in an energy storage means 18 (battery) of the autonomous lawn mower 2. The energy storage means 18 is a battery and may be charged by a power charging means 19. The power charging means 19 includes the charging control electronics and a connecting means 13 for connecting the battery 18 to the base station 3.

The control means 15 is described now in more detail. The control means 15 includes a sensor control module 15.1 and a sensor data analysis module 15.2. The sensor data analysis module 15.2 receives sensor data via a sensor signal from the sensor means 14, analyzes the received sensor data and calculates and determines the necessary control data for navigating the autonomous lawn mower 2. The analyzed and determined control data is provided to the propulsion control module 15.3 adapted to generate control signals required for navigating the autonomous lawn mower 2 by means of the propulsion means (motor) 16.

The sensor data analysis module 15.2 provides further analyzed and determined data to the sensor control module 15.1 of the control means 15, for example for controlling the sensor means 14 to acquire image data from a specific direction or in a specific resolution or image data extending over a specific vision angle.

The sensor data analysis module 15.2 may further analyze the sensor data acquired from the sensor means 14 with respect to a sensor state. The sensor data analysis means 15.2 may determine if the sensor means 15.1 provides reliable data or if the acquired sensor data is affected by a soiled sensor lens or soiled transparent sensor cover. Hence the sensor data analysis module 15.2 may provide a sensor cleaning module 15.4 of the control means 15 with the information if cleaning of the sensor means 14 or its transparent sensor cover is necessary.

The sensor cleaning control module 15.4 determines based on the information from sensor data analysis module 15.2, and/or based on elapsed time since the last sensor cleaning has been performed if a sensor cleaning is to be performed and further controls the sensor cleaning process.

The sensor cleaning control module 15.4 may also base the decision if the sensor cleaning is necessary on receiving a specific user request received via communication means via communication means (antenna) 12 from an external user interface or via an operator input on an interface situated on or within the main body of the autonomous lawn mower 2. A further user interface may be situated at the base station and be linked via the communication means (antennas) 9 and 12 wirelessly to the autonomous lawn mower 2 and its control means 15. In a further embodiment the system 1 including the autonomous lawn mower 2 may acquire via communication means 9 of the base station 2 a weather forecast and distribute the weather forecast, to the autonomous lawn mower 2 or distribute at least data for the sensor cleaning decision to the autonomous lawn mower 2 and the sensor cleaning control module 15.4 for determining if and/or in what intervals the sensor cleaning is to be performed.

The autonomous lawn mower 2 and/or the base station 3 may be further equipped with a weather sensing means in order to acquire and provide weather sensor data to the sensor cleaning control module 15.4 in order to determine if the sensor cleaning has to be executed.

Although the embodiment is described as determining if sensor cleaning is to be executed in the sensor cleaning control module 15.4 of the control module 15 arranged in the autonomous lawn mower 2 the determination may also be made in a control module of the base station or an control system external to the system 1 and communicated via communication means 9 and antenna 12 representing a communication capability of the autonomous lawn mower 2 to the autonomous lawn mower 2.

The sensor cleaning control module 15.4 of the control module 15 is further configured to control the cleaning process by issuing the necessary control commands for the sensor cleaning process to the propulsion control module 15.3 of the control module 15. The cleaning means 8 arranged at the base station 3 dispenses with any active actuating means of its own but is designed as an entirely passive cleaning means 8. The sensor cleaning control module 15.4 is therefore designed to issue the necessary commands to the propulsion control module 15.3 to navigate the autonomous lawn mower 2 to the base station 2, and more specifically to the first position 7 for cleaning the sensor means 14 and further to control the cleaning process by regularly moving the sensor means 14 resp. the entire autonomous lawn mower 2 along the stationary sensor cleaning means 8 arranged in manner to execute sensor cleaning when moving the autonomous lawn mower 2 into or from the first position 7 for cleaning the sensor means 14. The cleaning process of the sensor means 14 is then performed by relative movement of the movable autonomous lawn mower 2 with its fixedly attached sensor means 14 along the stationary base station 3 with its sensor cleaning means 8. The sensor cleaning means 8 at the base station therefore dispenses with any actuator (motor) of its own is a passive sensor cleaning means 8.

The sensor cleaning control module 15.4 issues the commands to the propulsion control module 15.3 for the cleaning of the sensor means 14. The sensor cleaning control module 15.4 may in another embodiment be arranged in a control module of the base station 3 and communicate signals for executing the sensor cleaning process to the propulsion control module 15.3 via the communication means 9 of the base station and the communication means 12 of the autonomous lawn mower 2.

If the base station 3 comprises the sensor cleaning means 8 arranged in a manner suitable for performing sensor cleaning when approaching or leaving the second position 5 for charging the energy storage means 18, the cleaning control means 15.4 is configured to control the cleaning control process when the autonomous lawn mower 2 is approaching the second position 5 for charging in this case identical to the first position for cleaning 7.

If the base station 3 comprises the sensor cleaning means 8 arranged for executing sensor cleaning spatially independent from the second position 5 for charging the energy storage means 18, the cleaning control means 15.4 is configured to control navigation of the autonomous lawn mower 2 to the first position 7 for cleaning at the base station 3.

The cleaning control module 15.4 of an embodiment of the invention is adapted to control the cleaning process itself based on sensor data acquired from the sensor means 14 and provided via the sensor data analysis module 15.2 of the control module 15 to the cleaning control module 15.4. This control of the cleaning process can include data on the result of the sensor cleaning, e.g. if the sensor means 14 is sufficiently cleaned and to repeat or terminate the cleaning process, and/or include data on specific cleaning actions such as moving the autonomous lawn mower 2 into a specific position or a specific direction on a suitable course in relation to the stationary cleaning means 8.

Figure 3:
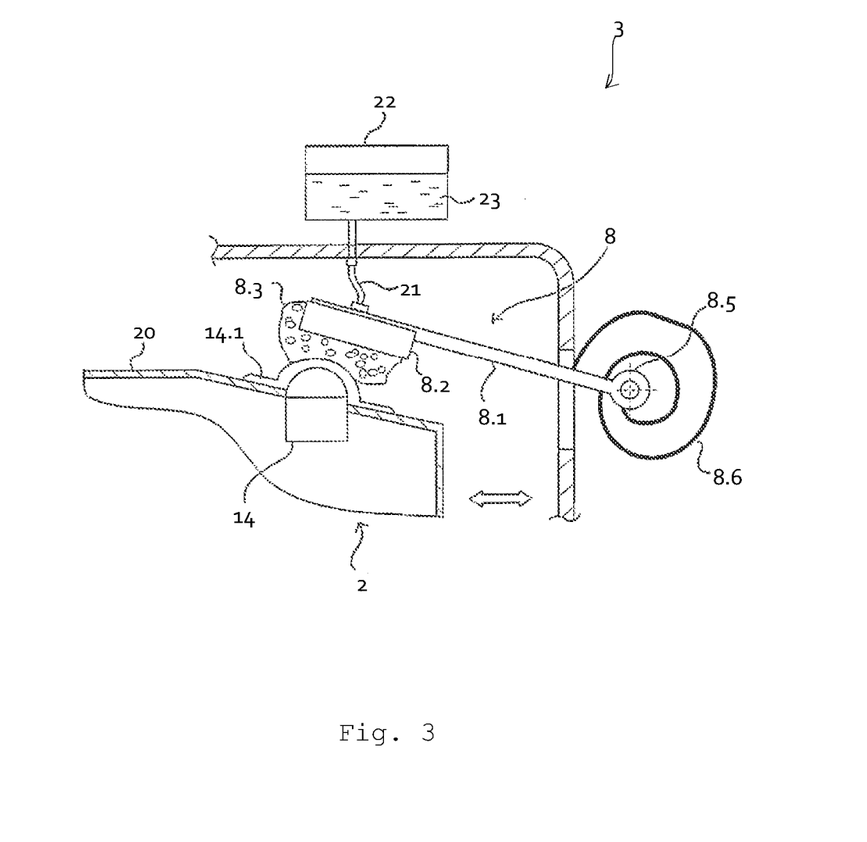
FIG. 3 shows a sensor cleaning system for an autonomous robot device according to the embodiment of the invention.

FIG. 3 shows an exemplary embodiment of the sensor cleaning means 8 arranged at the base station 3. The base station 3 is shown with its relevant portion in FIG. 3 only. The cleaning means 8 comprises a support unit 8.2 arranged at a first end of a cleaning means member 8.1. The cleaning means member 8.1 is at a second end opposite to the first end rotatably supported at a portion of the housing of the base station 3. A spiral spring 8.6 elastically bases the cleaning means member 8.1 at the second end so that it attempts to return into its rest position when the cleaning means member 8.1 is driven from its rest position by an external force. Such an external force is exerted by the sensor means 14 or a transparent sensor cover 14.1 protecting the sensor means 14 when the autonomous lawn mower 2 approaches the base station 3 in order to finally arrive at the first position for cleaning the sensor means 14.

In the support unit 8.2 at the first end of the cleaning means member 8.1 a wiping sponge 8.3 is positioned. Alternatively or additionally to the wiping sponge 8.3 a wiping cloth, a brush or other well known cleaning equipment is positioned in the carrier unit 8.2.

The cleaning means can also be configured to comprise a plurality of cleaning means members 8.1. Alternatives to the coils spring 8.6 such as a coil spring or an elastic member 8.1 instead of are also possible without departing from the claimed invention.

The cleaning sponge 8.3 depicted in FIG. 3 is further linked via a tube 21 to a reservoir 22. The reservoir 22 contains a cleaning fluid 23. The cleaning fluid 23 may be one of water and a mixture of water with a cleaning agent and a cleaning agent.

The tube 21 includes preferably a first flexible tube portion in order to take account of the movement of the cleaning member 8.1 and a second rigid pipe portion in a portion towards the static reservoir 22 in the body of the base station.

It is self explanatory that the arrangement in FIG. 3 may either be shown as top view or as side view, depending on the position of the sensor and of course the corresponding position of the clean means at the base station 3.

Figure 4:
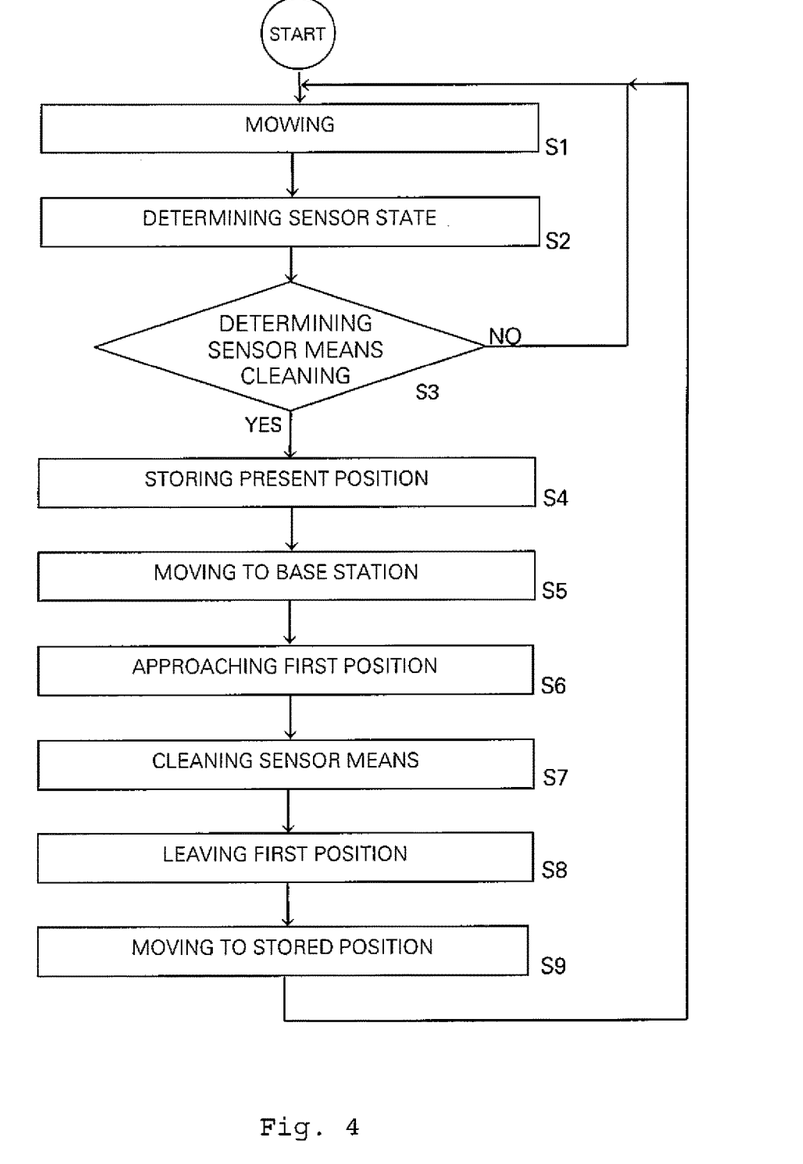
FIG. 4 is a flowchart depicting steps of a sensor cleaning method for an autonomous robot device according to an embodiment of the invention.

In FIG. 4 a sequence of method steps of a sensor cleaning process for an autonomous robot device according to an embodiment of the invention are presented in a flowchart.

The method for cleaning the sensor means 14 of a system comprising the autonomous robot device 2 and the base station 3 is detailed with reference to a sensor equipped autonomous lawn mower 2. In a first step S1 the autonomous lawn mower 2 is working on the assigned working area and is mowing grass. The sensor control module 15.1 continuously monitors the sensor state and at predetermined intervals determines a sensor state of the sensor means 14 in a step S2.

In a step S3 the sensor cleaning control module 15.4 determines whether the sensor means 14 is to be cleaned based on the determined sensor state, and/or based on elapsed time since performing the last sensor cleaning, and/or data relating to a weather report or a sensed weather, and/or a user request.

In an embodiment the sensor means 14 is to be cleaned each time the autonomous lawn mower 2 arrives at the base station 3 for recharging its battery 15 or refilling any energy storage means or working fluid tank, e.g. with a cleaning agent or fertilizer.

If in step S3 the decision is made not to clean the sensor means ("No") the autonomous lawn mower continues with executing its assigned task on the assigned working area, e.g. cutting grass.

If on the other hand it is determined in step S3 that cleaning of the sensor means 14 is indeed necessary ("YES") or at least is to be carried out, the method proceeds to step S4 and preferably stores the actual position of the autonomous lawn mower 2 in the working area in a step S4, dispenses with executing the assigned task of mowing and proceeds to step S5 of the method.

In the subsequent step S5 the autonomous lawn mower 2 moves to the base station 3 for cleaning its sensor means 14. More particularly the autonomous lawn mower 2 approaches in the following step S6 the first position for cleaning the sensor means 14 at the base station 3, wherein the first position is different to a second position at the base station for charging the autonomous lawn mower 2 at the base station 3.

In the subsequent step S7 the autonomous lawn mower 2 performs cleaning the sensor means 20 at the base station 3 by using the passive cleaning means 8 and the propulsion means 16 of the autonomous lawn mower 2. The step S7 includes moving the autonomous lawn mower 2 relative to the cleaning means 8 to effect the cleaning of the sensor means 14.

The step of cleaning S7 uses data acquired from the sensor means 14 in order to control the relative movement of the autonomous lawn mower 2 for the cleaning of the sensor means 14 with the stationary and passive sensor cleaning means 8. In a next step S8 the autonomous lawnmower leaves the first position for cleaning the sensor means 14 at the base station 3. In an embodiment the autonomous lawnmower may continue to a second position for recharging its energy storage means 18 at the base station.

In a step S9 succeeding to step S8, the autonomous lawnmower 2 now returns to the stored position in the assigned working area, where it previously in step S4 suspended executing its assigned task of mowing in order to clean its sensor means 14 and continues with mowing.

The invention claimed is:

1. A system comprising:
   an autonomous robot device, including a sensor means and a propulsion means; and
   a base station,
   wherein the base station is configured to charge an energy storage means or refill a fuel tank of the autonomous robot device and includes a cleaning means, and
   wherein the cleaning means is configured to clean the sensor means of the autonomous robot device.

2. The system according to claim 1, wherein
   the propulsion means is configured to move the autonomous robot device to generate a relative movement of the autonomous robot device including the sensor means with respect to the cleaning means to effect the cleaning of the sensor means.

3. The system according to claim 1, wherein
   the propulsion means of the autonomous robot device is configured to move the autonomous robot device towards a first position at the base station for performing cleaning,
   wherein the first position is different from a second position approached by the autonomous robot device for the charging of the autonomous robot device at the base station.

4. The system according to claim 1, wherein
   the cleaning means is configured to effect a brushing or swiping motion across the sensor means when the autonomous robot device approaches or departs from the first position.

5. The system according to claim 1, wherein
   the sensor means includes at least one camera.

6. The system according to claim 1, wherein
   the autonomous robot device is a lawn mower.

7. The system according to claim 1, wherein
   the cleaning means is configured to comprise a brush and/or a cleaning cloth and/or water and/or cleaning agents and/or pressurized gas.

8. The system according to claim 1, wherein
   the autonomous robot device further comprises control means configured to actuate cleaning of the sensor means each time the autonomous robot device arrives at or departs from the base station.

9. The system according to claim 1, wherein
   the autonomous robot device comprises control means configured to actuate cleaning of the sensor means according to a time schedule and/or upon user request and/or by a sensor state and/or based on sensed weather and/or based on a weather report.

10. The system according to claim 1, wherein
    the control means is configured to use data acquired from the sensor means in order to control relative movement of the autonomous robot device for the cleaning of the sensor means.

11. A base station for an autonomous robot device, wherein
    the base station includes a cleaning means,
    wherein the cleaning means is configured to clean a sensor means of the autonomous robot device, and wherein the base station is configured to charge an energy storage means or refill a fuel tank of the autonomous robot device.

12. The base station for an autonomous robot device according to claim 11, wherein
the base station includes the cleaning means operative to clean the sensor means when the autonomous robot device moves towards a first position for cleaning, and
the first position is different from a second position in which the autonomous robot device is charged at the base station.

13. The base station for an autonomous robot device according to claim 11, wherein
the cleaning means comprises a cleaning unit elastically supported at the base station.

14. Method for a system comprising an autonomous robot device, wherein the autonomous robot device includes a sensor means and a propulsion means, and the system further comprises a base station configured to charge an energy storage means or refill a fuel tank of the autonomous robot device and including a cleaning means,
the method comprising:
a step of moving the autonomous robot device to the base station for cleaning the sensor means, and
a step of cleaning the sensor means by the cleaning means.

15. The method according to claim 14, wherein
the step of cleaning includes moving the autonomous robot device relative to the cleaning means to effect the cleaning of the sensor means.

16. The method according to claim 14, wherein
the step of cleaning includes moving the autonomous robot device relative to the base station towards a first position at the base station of cleaning the sensor means,
wherein the first position is different to a second position at the base station for the charging of the autonomous robot device at the base station.

17. The method according to claim 14, wherein
the method further comprises a step of determining whether the sensor means is to be cleaned,
wherein in the step of determining it is determined that the sensor means is to be cleaned each time the autonomous robot device arrives at or departs from the base station, and/or
cleaning of the sensor means according to a time schedule, and/or
cleaning of the sensor means is based on a user request and/or based on a sensor state and/or based on a sensed weather and/or by a weather report.

18. The method according to claim 14, wherein
the step of cleaning uses data acquired from the sensor means in order to control the relative movement of the autonomous robot device for the cleaning of the sensor means.

* * * * *